United States Patent Office 3,458,585
Patented July 29, 1969

3,458,585
PROCESS FOR THE TRIMERIZATION OF BUTADIENE
Henricus Gerardus Josef Overmars and Jan Gerrit Noltes, Bunnik, Utrecht, Netherlands, assignors to International Lead Zinc Research Organization, Inc., New York, N.Y., a membership corporation of New York
No Drawing. Filed Jan. 9, 1968, Ser. No. 696,517
Claims priority, application Netherlands, July 13, 1967, 6709771
Int. Cl. C07c *3/18, 3/10*
U.S. Cl. 260—666          9 Claims

ABSTRACT OF THE DISCLOSURE

A process for trimerizing butadiene to prepare 1,5,9-cyclododecatriene, in which butadiene is catalyzed in a solvent with a catalyst comprising a mixture of titaniumtetrachloride and diarylzinc.

---

This invention relates to a process for the trimerization of butadiene to prepare 1,5,9-cyclododecatriene.

Butadiene may be trimerized to form 1,5,9-cyclododecatriene which is the starting substance for the preparation of laurinelactam, which in turn may be converted into polyamide. A known process utilizes a catalyst in solution. The catalyst is a combination of titaniumtetrachloride and ethylaluminiumchloride having the general formula $(C_2H_5)_3Al_2Cl_3$. It is customary to add activators such as acetone, ferric chloride or phosphites.

It is an object of this invention to provide a process for trimerizing butadiene to prepare 1,5,9-cyclododecatriene. It is also an object of this invention to provide a catalyst containing diarylzinc for use in trimerizing butadiene.

According to the present invention the process for the trimerization of butadiene includes the step of mixing butadiene in a non-aqueous solvent with a catalyst containing titaniumtetrachloride and diarlyzinc having the formula $(aryl)_2$ zinc, wherein aryl is a monocarbocyclicaryl radical, such as phenyl, tolyl, xylyl, and the like.

Through the use of the present process a high yield of 1,5,9-cyclododecatriene may be rapidly obtained. In addition the presence of activators is unnecessary to this process and in most cases is undesirable.

The monocarbocyclicaryl radical may be a phenyl radical, or a substituted phenyl radical such as tolyl, xylyl, and the like.

As solvents, hydrocarbons such as hexane, heptane, cyclohexane, benzene, toluene, and higher boiling petroleum fractions may be employed. The reaction product 1,5,9-cyclododecatriene may also be used as well as mixtures of solvents. It is preferred to use the pure solvents which contain no water. The quantity of solvent with respect to the quantity of butadiene to be converted may vary within wide limits. Solvents in quantities of up to 10 times the volume of butadiene have been employed with success. Good results are obtained if 1 to 3 volumes of solvent are used per volume of butadiene.

The molar ratio of diarylzinc to titaniumtetrachloride may vary from 1:1 to 10:1, but the highest yield in 1,5,9-cyclododecatriene is obtained when the ratio is approximately 2:1. The presence of a molar excess of titaniumtetrachloride leads to undesirable secondary reactions.

The order in which the two components of the catalyst system are introduced into the solvent is arbitrary and may be effected at temperatures between −50° C. and +100° C. Normal room temperature is the preferred operating temperature. The resulting catalyst obtained is insoluble, and therefore it is expedient to stir the catalyst during preparation. Heating of the catalyst system before trimerization is not necessary; however, it is not disadvantageous.

The quantity of diarylzinc in the system with respect to the quantity of butadiene to be trimerized may be approximately 0.1 to 10 mole percent. It is preferable to use approximately 0.5 to 1.5 mole percent.

The process is carried out at a temperature of between 0° C. and 200° C. At room temperature the trimerization product forms rather quickly and includes some polymeric material. At an elevated temperature (up to 70° C.) the reaction proceeds rapidly. Stirring during the reaction is desirable.

Although the reatcion may be carried out at normal pressure, it is desirable to make adequate provision for maintaining the unconverted butadiene within the reaction medium during the reaction. Operating under the vapor pressure of butadiene or of the solvent in a closed system is effective for this purpose.

The reaction product, 1,5,9-cyclododecatriene, may be obtained from the reaction mixture by distillation. It is preferred to inactivate the catalyst first by adding methanol. It is also possible to remove the catalyst prior to fractionating by washing the solution with aqueous hydrochloric acid.

The fractionated cyclododecatriene contains substantially no isomers, as may be shown by gas chromatography. It appears from the infra-red spectrum of the distillate that the product is exclusively trans-trans-cis-cyclododecatriene-1,5,9 which is formed.

The following examples are intended to illustrate the process of the invention and are not to be construed as defining the scope of the invention.

EXAMPLE I

A portion of dry benzene weighing 450 gm. was introduced into a dry reaction vessel and provided with a reflux cooler cooled with carbon dioxide snow and acetone. The air was replaced by pure nitrogen, after which 10 gm. butadiene, 6.6 gm. diphenylzinc dissolved in 50 gm. benzene and 2.9 gm. titaniumtetrachloride were added successively while stirring. After a short period of stirring, 180 gm. butadiene were introduced. The mixture was stirred during 15 hours at room temperature, after which no further refluxing occurred. After adding 50 gm. methanol, the reaction mixture was filtered and washed with aqueous hydrochloric acid and water. The solvent was distilled off and the liquid residue was fractionated at 12 mm. vacuum. The yield in trans-trans-cis-1,5,9-cyclododecatriene was 70%.

EXAMPLE II

The experiment set forth in Example I was repeated, but with toluene as the solvent, the reaction vessel being heated to 70° C. After 2 hours, refluxing had ceased to occur. The further processing was effected as set forth in Example I. The yield amounted to 75%.

EXAMPLE III

A catalyst mixture was prepared from 3.7 gm. ditolylzinc and 1.9 gm. titaniumtetrachloride in 250 gm. benzene. The suspension was transferred to an autoclave under anaerobic and dry conditions. The autoclave was cooled to −20° C., and 100 gm. butadiene were condensed in the pressure vessel. The suspension was heated at 40° C. for 2 hours. After cooling, the contents were processed as set forth in Example I. The yield in 1,5,9-cyclododecatriene amounted to 71%.

EXAMPLE IV

A catalyst system was prepared from 45 gm. of 1,5,9-cyclododecatriene, 0.7 gm. diphenylzinc and 0.3 gm.

TiCl$_4$. The suspension was transferred to a dry Carius tube, which had a narrowing about 10 cm. below the opening and was provided with a needle guide and cork. The tube was filled with pure nitrogen and was cooled down to −80° C., after which 18 gm. butadiene were condensed in the tube by means of an injection needle. After it had been closed by melting, the tube was heated to 40° C. in a water bath for 30 minutes. After cooling, the tube was opened in the usual manner and the contents were distilled following filtration. The yield in 1,5,9-cyclododecatriene amounted to 74%.

We claim:

1. A process for preparing 1,5,9-cyclododecatriene by trimerizing butadiene, comprising adding to a non-aqueous solvent a catalyst consisting essentially of titaniumtetrachloride and diarylzinc wherein aryl represents monocarbocyclicaryl, adding butadiene to the catalyst mixture, and trimerizing the butadiene to prepare 1,5,9-cyclododecatriene.

2. A process as set forth in claim 1, wherein the amount of diarylzinc employed is from 1 to 10 moles per mole of titaniumtetrachloride.

3. A process as set forth in claim 2, wherein the amount of diarylzinc employed is 2 moles per mole of titaniumtetrachloride.

4. A process as set forth in claim 1, wherein the diarylzinc compound is diphenylzinc.

5. A process as set forth in claim 1, wherein the diarylzinc compound is ditolylzinc.

6. A process as set forth in claim 1, wherein the diarylzinc compound is dixylylzinc.

7. A process as set forth in claim 1, wherein the temperature of reaction is approximately 70° C.

8. A process as set forth in claim 1, wherein the trimerization occurs in a closed system under pressure.

9. In a process for preparing 1,5,9-cyclododecatriene by trimerizing butadiene, the step of employing a catalyst consisting essentially of titaniumtetrachloride and diarylzinc.

References Cited

UNITED STATES PATENTS

| | | | |
|---|---|---|---|
| 3,247,269 | 4/1966 | Storrs | 260—666 |
| 3,247,270 | 4/1966 | Kirk | 260—666 |
| 3,214,484 | 10/1965 | Wittenberg | 260—666 |
| 3,149,174 | 9/1964 | Mueller | 260—666 |
| 3,149,173 | 9/1964 | Wittenberg | 260—666 |
| 3,377,397 | 4/1968 | Maxfield | 260—666 |

DELBERT E. GANTZ, Primary Examiner

V. O. KEEFE, Assistant Examiner